United States Patent
Utsunomiya et al.

(10) Patent No.: US 12,547,343 B2
(45) Date of Patent: Feb. 10, 2026

(54) INFORMATION PROCESSOR AND INFORMATION PROCESSING METHOD

(71) Applicant: TOYOTA JIDOSHA KABUSHIKI KAISHA, Toyota (JP)

(72) Inventors: Takahiro Utsunomiya, Tokyo (JP); Junichiro Tamao, Tokyo (JP); Tomoaki Karasawa, Matsudo (JP); Takumi Horie, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 18/398,478

(22) Filed: Dec. 28, 2023

(65) Prior Publication Data
US 2024/0256178 A1 Aug. 1, 2024

(30) Foreign Application Priority Data

Jan. 27, 2023 (JP) .................. 2023-011022

(51) Int. Cl.
*G06F 3/06* (2006.01)
(52) U.S. Cl.
CPC .......... *G06F 3/0658* (2013.01); *G06F 3/0652* (2013.01); *G06F 3/0604* (2013.01); *G06F 3/0679* (2013.01)
(58) Field of Classification Search
CPC .. G06N 3/04; G06N 3/08; G06N 3/00; G06N 5/00; G06N 7/00; G06N 10/00; G06N 20/00; G06F 11/22; G06F 3/12; G06F 12/02; G06F 12/10; G06F 12/1009; G06F 13/42; G06F 8/71; G06F 9/30; G06F 9/4401; G06F 9/445; G06F 13/00; G06F 12/14; G06F 16/33; G06F 3/06; G06F 40/106; G06F 40/186; G06F 5/00; G06F 12/00; G06F 16/174; G06F 21/00; G06F 40/174

See application file for complete search history.

(56) References Cited

U.S. PATENT DOCUMENTS 6,424,423 B1* 7/2002 Hosokawa ............ G06K 15/005
358/1.11
2010/0138434 A1* 6/2010 Kawauchi .............. G01C 21/36
707/E17.014

FOREIGN PATENT DOCUMENTS

| JP | 9-116574 | 5/1997 |
| JP | 2012-64094 | 3/2012 |
| JP | 2021-135511 A | 9/2021 |

* cited by examiner

*Primary Examiner* — Rayeez R Chowdhury
(74) *Attorney, Agent, or Firm* — Oblon, McClelland, Maier & Neustadt, L.L.P.

(57) ABSTRACT

An information processor and an information processing method are provided. Processing circuitry receives a data piece from another controller to manage a storage device provided in a vehicle. The data piece includes a character string. The character string includes a specific character and one or more start direction characters. The one or more start direction characters are one or more characters positioned in a start direction relative to the specific character in the character string. The processing circuitry writes only the one or more start direction characters to the storage device to update a stored content of the storage device.

3 Claims, 3 Drawing Sheets

INFORMATION PROCESSOR AND INFORMATION PROCESSING METHOD

BACKGROUND

1. Field

The present disclosure relates to an information processor and an information processing method for managing a storage device.

2. Description of Related Art

Japanese Laid-Open Patent Publication No. 2021-135511 discloses a system that manages storage devices.

Generally, the storage capacity of a storage device is limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an information processor. The information processor includes processing circuitry. The processing circuitry receives a data piece from another controller to manage a storage device provided in a vehicle. The data piece includes a character string. The character string includes a specific character and one or more start direction characters. The one or more start direction characters are one or more characters positioned in a start direction relative to the specific character in the character string. The processing circuitry writes, when receiving the data piece from the other controller, only the one or more start direction characters to the storage device to update a stored content of the storage device based on the received data piece.

Of the character string included in the data piece received from the other controller, the information processor causes the storage device to store only the characters positioned in the start direction relative to the specific character. Thus, as compared to when, for example, the storage device also stores the characters positioned in an end direction relative to the specific character in the character string, the information processor reduces the amount of data stored in the storage device.

Another aspect of the present disclosure provides an information processing method. The information processing method includes receiving, by processing circuitry, a data piece from another controller to manage a storage device provided in a vehicle. The data piece includes a character string. The character string includes a specific character and one or more end direction characters. The one or more end direction characters are one or more characters positioned in an end direction relative to the specific character in the character string. The information processing method includes deleting, by the processing circuitry, the one or more end direction characters. The information processing method includes writing to the storage device, by the processing circuitry, the data piece from which the one or more end direction characters have been deleted.

The information processing method obtains an effect equivalent to that of the information processor.

A further aspect of the present disclosure provides a non-transitory computer-readable storage medium that stores a program that causes a processor to execute information processing that includes the same processes as those of the information processor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An information processor and an information processing method according to an embodiment will now be described with reference to FIGS. 1 to 4.

Figure 1:
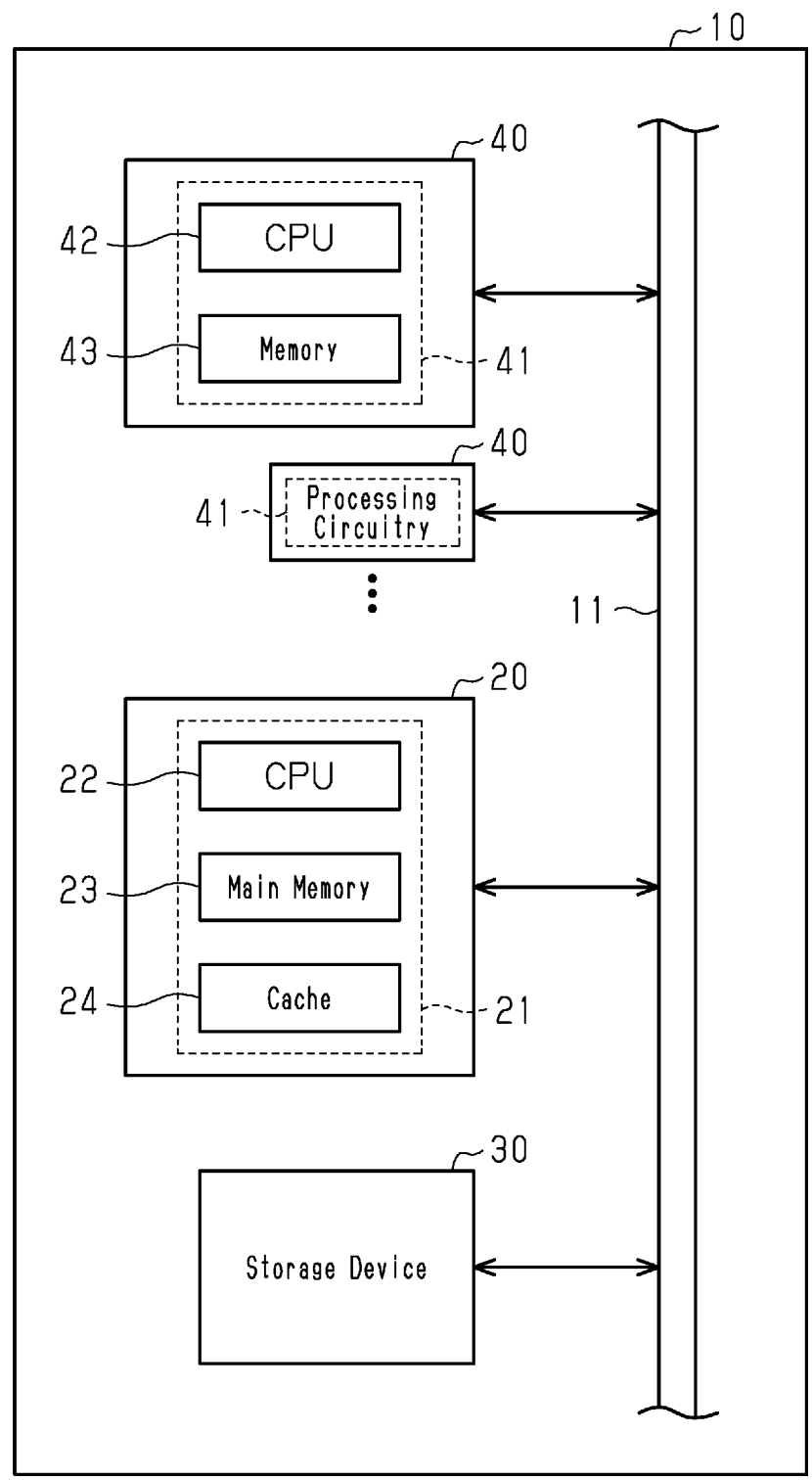
FIG. 1 is a schematic diagram illustrating a control system including an information processor and a storage device according to an embodiment.

FIG. 1 illustrates an on-board control system 10. The control system 10 includes an information processor 20, a storage device 30 managed by the information processor 20, and controllers 40. That is, the storage device 30 is provided in the vehicle. Further, the controller 40 corresponds to another controller for the information processor 20. The information processor 20, the storage device 30, and the controllers 40 send and receive a data piece via the bus 11. For example, the bus 11 is a CAN. CAN is an abbreviation for "Controller Area Network."

Controller

Each of the controllers 40 includes processing circuitry 41. For example, the processing circuitry 41 is an electronic control unit. In this case, the processing circuitry 41 includes a CPU 42 and a memory 43. The memory 43 stores a control program executed by the CPU 42. When the CPU 42 executes the control program, the processing circuitry 41 provides at least one feature. The term "feature" as used herein includes a feature related to driving of the vehicle, a feature for storing an image inside or outside the vehicle, a feature for automatically updating firmware, and the like.

Storage Device

The storage device 30 can store various programs and various types of data. The storage device 30 is an electrically rewritable non-volatile memory. The storage device 30 is a NAND flash memory. An example of the storage device 30 is an eMMC. The term "eMMC" is an abbreviation of "embedded Multi Media Card." The storage device 30 has a maximum number of write operations. The number of write operations for the storage device 30 corresponds to the number of times that a data piece has been written to the same memory cell. Thus, the term "write operation" includes not only writing information to an empty memory cell but also overwriting the stored content of a memory cell to which information has already been written. The maximum number of write operations on the storage device 30 is the number of write operations that can be performed on one memory cell or a predetermined memory frame. Thus, the total capacity that can be written to the storage device 30 including overwriting of data is a value obtained by multiplying the capacity of a memory cell or a memory frame, the number of memory cells or memory frames, and the number of write operations that can be performed.

Information Processor

The information processor 20 includes the processing circuitry 21. When the information processor 20 receives the data piece sent by the controller 40 via the bus 11, the processing circuitry 21 updates the stored content of the storage device 30 based on the data piece. For example, the processing circuitry 21 is an electronic control unit. In this case, the processing circuitry 21 includes a CPU 22, a main memory 23, and a cache memory 24. The main memory 23 stores a management program used to manage the storage device 30. When the CPU 22 executes the management program, the processing circuitry 21 executes various processes in the information processing method for managing the storage device 30. That is, when the information processor 20 receives a data piece from the controller 40 via the bus 11, the processing circuitry 21 stores the data piece in the cache memory 24. When the data piece stored in the cache memory 24 is a data piece that should be stored in the storage device 30, the processing circuitry 21 updates the stored content of the storage device 30 based on the data piece stored in the cache memory 24.

Feature Configuration

Figure 2:
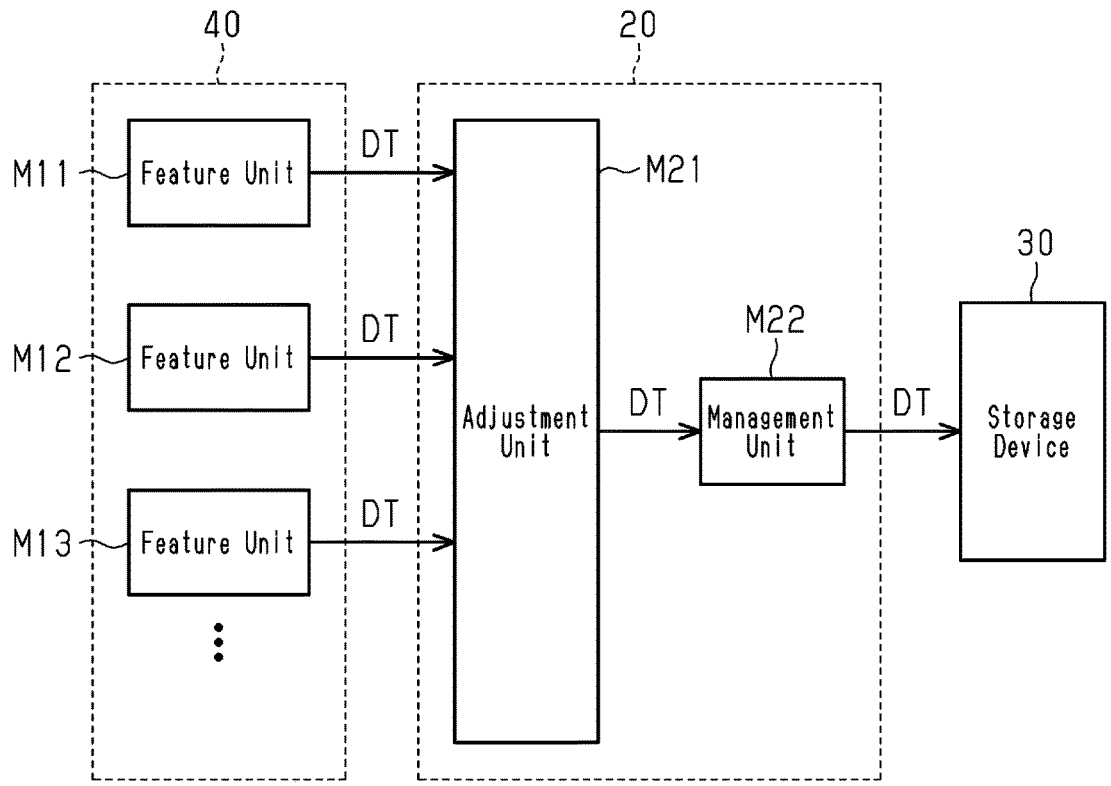
FIG. 2 is a block diagram showing a feature configuration of the control system of FIG. 1.
Figure 3:
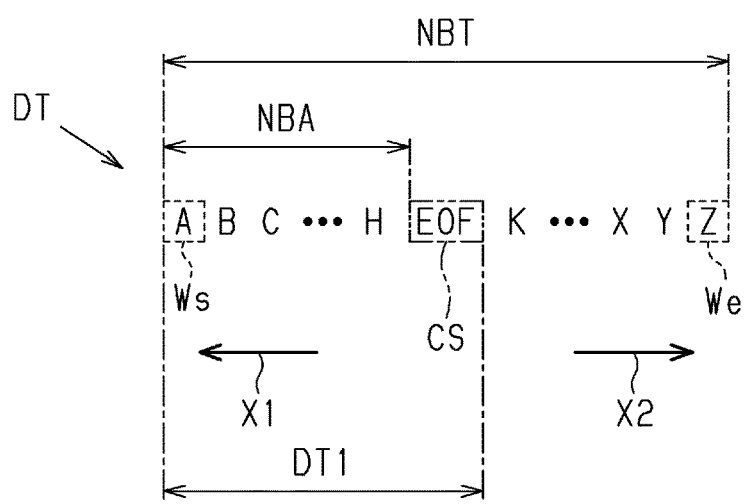
FIG. 3 is a schematic diagram illustrating the configuration of a data piece sent by the controller included in the control system of FIG. 1.

Referring to FIGS. 2 and 3, a feature configuration of the control system 10 will be described.

As shown in FIG. 2, when the CPU 42 executes the control program stored in the memory 43, the processing circuitry 41 of the controller 40 functions as feature units M11, M12, M13, . . . . The feature units M11, M12, M13, . . . correspond to features such as the features related to driving of the vehicle, etc., described above. When the CPU 22 executes the management program stored in the main memory 23, the processing circuitry 21 functions as the adjustment unit M21 and the management unit M22.

The feature units M11, M12, M13, . . . each send a data piece DT that should be written to the storage device 30.

FIG. 3 shows the structure of the data piece DT. The data piece DT is a character string composed of characters. The number of characters (data amount) from the first character to the end character We of the character string of the data piece DT is referred to as a total data size NBT. The total data size NBT of the data piece DT sent from the controller 40 is set in advance. For example, the total data size NBT is represented by the number of bytes.

The data piece DT includes "EOF," a specific character CS, in the middle of the character string. EOF, the specific character CS, is a control code indicating the end of the file. Thus, in the character string of the data piece DT illustrated in FIG. 3, the characters positioned in the end direction X2 relative to EOF are used to adjust the data length (data amount) of the data piece DT. That is, in the character string of the data piece DT, the characters positioned in the end direction X2 relative to EOF are not included in the file. In the character string of the data piece DT, the characters positioned in the start direction X1 relative to EOF need to be written to the storage device 30. In the character string of the data piece DT, the characters positioned in the end direction X2 relative to EOF do not need to be written to the storage device 30. In the example shown in FIG. 3, "ABC . . . H" corresponds to the character string positioned in the start direction X1 relative to EOF. That is, "ABC . . . H" represents start direction characters. The start direction characters are one or more characters positioned in the start direction X1 relative to the specific character CS in the character string of the data piece DT. Further, "K . . . XYZ" corresponds to a character string positioned in the end direction X2 relative to EOF. That is, "K . . . XYZ" represents end direction characters. The end direction characters are one or more characters positioned in the end direction X2 relative to the specific character CS in the character string of the data piece DT.

Referring back to FIG. 2, the adjustment unit M21 executes a deletion process that deletes the characters positioned in the end direction X2 relative to the specific character CS in the character string of the data piece DT received from each of the feature units M11, M12, M13. In the present specification, one or more characters positioned in the end direction X2 relative to the specific character CS may be referred to as one or more end direction characters. A group of one or more end direction characters may be referred to as a post-CS character group. That is, the adjustment unit M21 creates a shortened data piece DT1 ending with the specific character CS. In other words, the shortened data piece DT1 is a data piece in which one or more end direction characters have been deleted from the data piece DT.

The management unit M22 executes an update process that writes, to the storage device 30, the shortened data piece DT1 in which the end character is the specific character CS.

Information Processing Method

Figure 4:
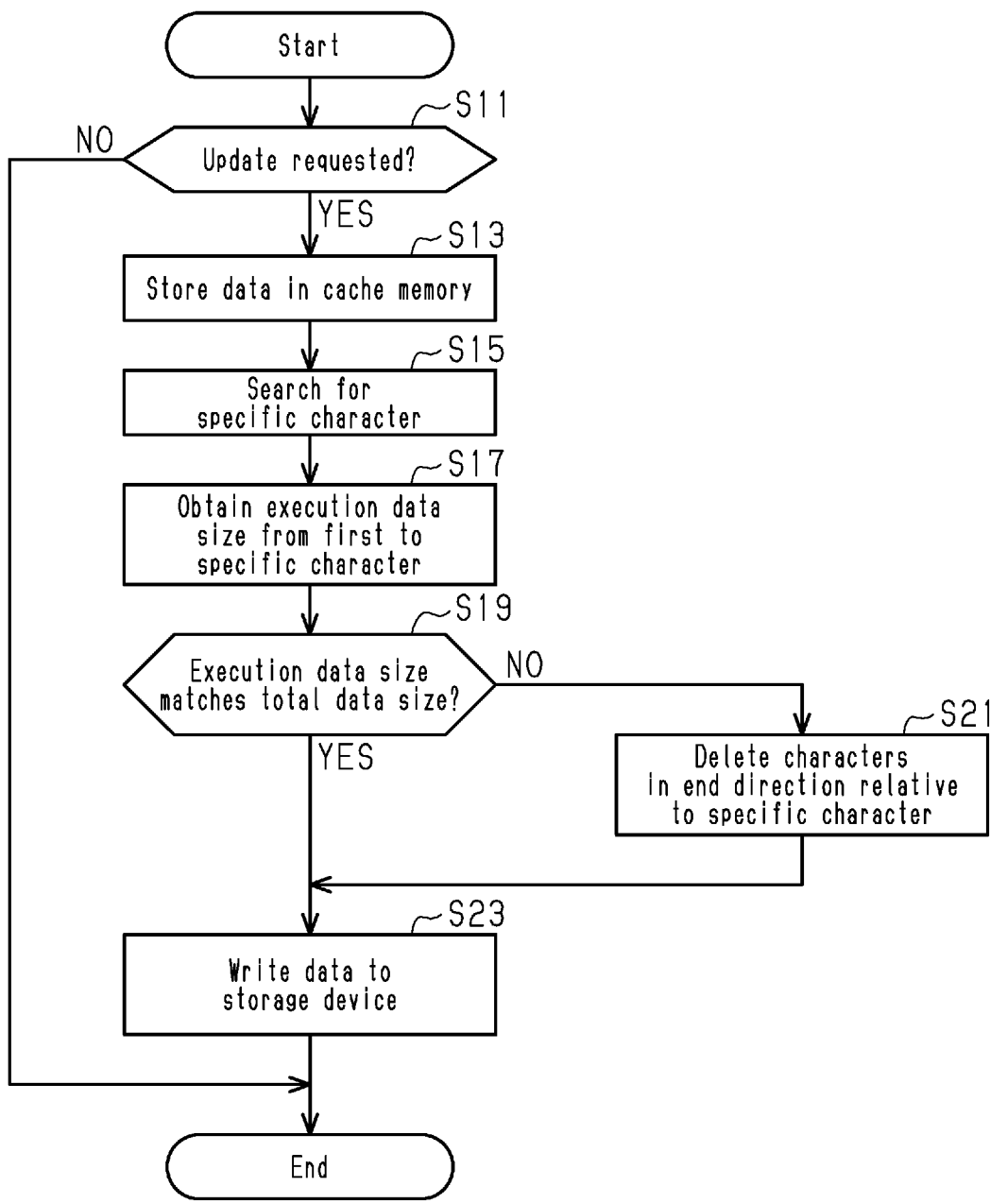
FIG. 4 is a flowchart illustrating a series of processes executed by the information processor of FIG. 1.

FIG. 4 illustrates a procedure of executing various processes in the information processing method. When the information processor 20 receives the data piece DT from the controller 40, the processing circuitry 21 executes a series of processes illustrated in FIG. 4.

In step S11, the processing circuitry 21 determines whether there is an update request for the stored content of the storage device 30. The processing circuitry 21 determines that there is an update request when the received data piece DT is a data piece that needs to be stored in the storage device 30 (S11: YES). Thereafter, the process proceeds to step S13. When the received data piece DT is a data piece that does not need to be stored in the storage device 30, the processing circuitry 21 determines that there is no update request (S11: NO) and ends the series of processes.

In step S13, the processing circuitry 21 stores the received data piece DT in the cache memory 24, which is included in the processing circuitry 21. Then, the processing circuitry 21 proceeds to step S15.

In step S15, by functioning as the adjustment unit M21, the processing circuitry 21 searches for the specific character CS from the character string of the data piece DT stored in the cache memory 24. When the specific character CS is found, the processing circuitry 21 shifts the process to step S17.

In step S17, the processing circuitry 21 functions as the adjustment unit M21 to obtain the execution data size NBA. The execution data size NBA is the number of characters (data amount) from the first character Ws to the specific character CS in the character string of the data piece DT. Subsequently, in step S19, the processing circuitry 21 functions as the adjustment unit M21 to determine whether the execution data size NBA matches the total data size NBT of the data piece DT. When the execution data size NBA matches the total data size NBT (S19: YES), the processing circuitry 21 shifts the process to step S23. When the execution data size NBA does not match the total data size NBT (S19: NO), the processing circuitry 21 shifts the process to step S21.

In step S21, the processing circuitry 21 functions as the adjustment unit M21 to delete the post-CS character group from the character string of the data piece DT. That is, the process of step S21 corresponds to the deletion process. After executing the deletion process, the processing circuitry 21 proceeds to step S23.

In step S23, the processing circuitry 21 functions as the management unit M22 to write the data piece DT stored in the cache memory 24 to the storage device 30. For example, the shortened data piece DT1 in which the specific character CS is the end character is written to the storage device 30. That is, the process of step S23 corresponds to the update process. Thereafter, the processing circuitry 21 ends the series of processes.

Operation and Advantages of Present Embodiment

As a comparative example in which the processing circuitry of an information processor does not execute the deletion process will now be described. In the comparative example, the processing circuitry of the information processor stores the data piece DT sent from the controller 40 in a cache memory, and then writes the data piece DT to the storage device 30. That is, in the character string of the data piece DT, characters that do not need to be written to the storage device 30 may also be written to the storage device 30.

Subsequently, as the comparative example, for example, in order to reduce the amount of data to be written to the storage device 30, the following process may be executed. For example, the controller 40 sends an instruction to delete the post-CS character group to the information processor. Upon receiving the deletion instruction, the processing circuitry of the information processor deletes the post-CS character group from the character string of the data piece DT that has been written to the storage device 30. In this case, in order to reduce the amount of data to be stored in the storage device 30, it is necessary to design the control program that has been stored in the memory 43 so that the deletion instruction can be sent to the information processor. In addition, the number of accesses to the storage device 30 by the information processor may increase. The comparative example has been described above.

Contrary to this, in the present embodiment, when storing the data piece DT sent from the controller 40 in the cache memory 24, the processing circuitry 21 of the information processor 20 executes the deletion process if necessary before writing the data piece DT to the storage device 30. This allows the processing circuitry 21 to create the shortened data piece DT1 in which the specific character CS is the end character. Then, the processing circuitry 21 writes the shortened data piece DT1 to the storage device 30. This allows the information processor 20 to reduce the amount of data to be stored in the storage device 30. In the present embodiment, for example, as a method for reducing the amount of data to be stored in the storage device 30, there is no need to design a control program that has been stored in the memory 43 so that the controller 40 can send the deletion instruction described in the comparative example to the information processor 20. Thus, an increase in the number of accesses to the storage device 30 by the information processor 20 is limited.

Modifications

The above embodiment may be modified as follows. The above embodiment and the following modifications can be combined as long as the combined modifications remain technically consistent with each other.

In the above embodiment, writing of a data piece to the storage device 30 provided separately from the information processor 20 has been described, but the present invention is not limited thereto. For example, when the information processor 20 includes a non-volatile memory, the non-volatile memory can be handled as a storage device. Thus, the processing circuitry of the information processor 20 may execute the series of processes illustrated in FIG. 4 when writing the data piece DT received from the controller 40 to the non-volatile memory of the information processor 20.

The processing circuitry 21 of the information processor 20 does not have to execute the deletion process if only the characters positioned in the start direction X1 relative to the specific character CS in the character string of the data piece DT stored in the cache memory 24 can be written to the storage device 30.

The processing circuitry 21 is not limited to a device that includes a CPU and a ROM and executes software processing. That is, the processing circuitry 21 may be modified as long as it has any one of the following configurations (a) to (c).

(a) The processing circuitry 21 includes one or more processors that execute various processes in accordance with a computer program. The processor includes a CPU and a memory, such as a RAM and ROM. The memory stores program codes or instructions configured to cause the CPU to execute the processes. The memory, or a non-transitory computer-readable storage medium, includes any type of media that are accessible by general-purpose computers and dedicated computers.

(b) The processing circuitry 21 includes one or more dedicated hardware circuits that execute various processes. Examples of the dedicated hardware circuits include an application specific integrated circuit (ASIC) and a field programmable gate array (FPGA).

(c) The processing circuitry 21 includes a processor that executes part of various processes in accordance with a computer program and a dedicated hardware circuit that executes the remaining processes.

The phrase "at least one of" as used in this description means "one or more" of a desired choice. For example, the phrase "at least one of" as used in this description means "only one choice" or "both of two choices" in a case in which the number of choices is two. In another example, the phrase "at least one of" as used in this description means "only one single choice" or "any combination of two or more choices" if the number of its choices is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An information processor, comprising processing circuitry configured to:
   receive a data piece from another controller to manage a storage device provided in a vehicle, the data piece including a character string, the character string including a specific character and one or more start direction characters, and the one or more start direction characters being one or more characters positioned in a start direction relative to the specific character in the character string; and
   when receiving the data piece from the other controller, write only the one or more start direction characters to the storage device to update a stored content of the storage device based on the received data piece.

2. The information processor according to claim 1, wherein
   the character string includes one or more end direction characters,
   the one or more end direction characters are one or more characters positioned in an end direction relative to the specific character, and
   the processing circuitry is configured to:
      delete the one or more end direction characters; and
      write, to the storage device, the data piece from which the one or more end direction characters have been deleted.

3. An information processing method, comprising:
   receiving, by processing circuitry, a data piece from another controller to manage a storage device provided in a vehicle, the data piece including a character string, the character string including a specific character and one or more end direction characters, and the one or more end direction characters being one or more characters positioned in an end direction relative to the specific character in the character string;
   deleting, by the processing circuitry, the one or more end direction characters; and
   writing to the storage device, by the processing circuitry, the data piece from which the one or more end direction characters have been deleted.

\* \* \* \* \*